(12) United States Patent
Holmes et al.

(10) Patent No.: US 7,656,311 B2
(45) Date of Patent: Feb. 2, 2010

(54) POSITION TRACKING AND PROXIMITY WARNING SYSTEM

(75) Inventors: Steven C. Holmes, Safford, AZ (US); Mark W. Bartlett, Safford, AZ (US); Robert D. Coyle, Mesa, AZ (US); Russell Armbrust, Morenci, AZ (US); Donald W. Treadaway, Morenci, AZ (US); Steve L. Williamson, Phoenix, AZ (US); James Edward Hanson, Morenci, AZ (US); Jennifer D. Carpenter, Tucson, AZ (US)

(73) Assignee: Phelps Dodge Corporation, Phoenix, AZ (US)

( * ) Notice: Subject to any disclaimer, the term of this patent is extended or adjusted under 35 U.S.C. 154(b) by 297 days.

(21) Appl. No.: 11/751,298

(22) Filed: May 21, 2007

(65) Prior Publication Data

US 2007/0268155 A1 Nov. 22, 2007

Related U.S. Application Data

(60) Provisional application No. 60/802,576, filed on May 22, 2006.

(51) Int. Cl.
*G08G 1/123* (2006.01)
(52) U.S. Cl. .................................. 340/988; 701/50
(58) Field of Classification Search ................ 340/988, 340/436; 342/455; 701/50, 200, 208, 301
See application file for complete search history.

(56) References Cited

U.S. PATENT DOCUMENTS

| | | | |
|---|---|---|---|
| 5,906,648 A * | 5/1999 | Zoratti et al. | 701/50 |
| 6,480,769 B1 * | 11/2002 | Kageyama | 701/50 |
| 6,781,470 B2 | 8/2004 | Rogerson | |
| 6,895,059 B2 | 5/2005 | Rogerson et al. | |
| 6,989,782 B2 | 1/2006 | Walker et al. | |
| 7,177,368 B2 | 2/2007 | Humphreys et al. | |
| 7,236,464 B2 | 6/2007 | Walker et al. | |
| 7,321,601 B2 | 1/2008 | Rogerson et al. | |
| 7,342,973 B2 | 3/2008 | Walker et al. | |
| 7,403,575 B2 | 7/2008 | Gehring et al. | |
| 7,433,322 B1 | 10/2008 | Alapuranen | |
| 2002/0022927 A1 | 2/2002 | Lemelson et al. | |
| 2004/0102894 A1 | 5/2004 | Holler | |
| 2005/0060069 A1 | 3/2005 | Breed et al. | |

(Continued)

OTHER PUBLICATIONS

International Preliminary Report on Patentability dated Dec. 11, 2008 for PCT Application No. PCT/US07/069385 (7 pages).

(Continued)

*Primary Examiner*—John A Tweel, Jr.
(74) *Attorney, Agent, or Firm*—Fennemore Craig, P.C.

(57) ABSTRACT

A position tracking system for determining a position of a vehicle. The position tracking system invention includes at least two position-enabled mesh nodes mounted to the vehicle and a mesh network operatively associated with the at least two position-enabled mesh nodes mounted to the vehicle. The mesh network is configured to determine a position of the vehicle based on signals received from the at least two position-enabled mesh nodes mounted to the vehicle. The position tracking system also includes a display system, which is operatively associated with the mesh network and which displays the position of the vehicle.

17 Claims, 10 Drawing Sheets

U.S. PATENT DOCUMENTS

2005/0149251 A1    7/2005   Donath et al.
2005/0197755 A1    9/2005   Knowlton et al.
2006/0195237 A1*   8/2006   Makela ........................ 701/301
2009/0043462 A1*   2/2009   Stratton et al. ................. 701/50

OTHER PUBLICATIONS

International Search Report and Written Opinion of the International Searching Authority dated Apr. 28, 2008 for PCT Application No. PCT/US07/69385 (8 pages).

* cited by examiner

300

310 — COLLECTING VEHICLE POSITION DATA FROM A FIRST POSITION-ENABLED MESH NODE MOUNTED AT A FIRST LOCATION OF A VEHICLE AND A SECOND POSITION-ENABLED MESH NODE MOUNTED AT A SECOND LOCATION OF THE VEHICLE

320 — COMPARING THE VEHICLE POSITION DATA TO OBJECT POSITION DATA ASSOCIATED WITH AT LEAST ONE OTHER OBJECT

330 — STOPPING MOTION OF THE VEHICLE IF THE VEHICLE POSITION DATA AND THE OBJECT POSITION DATA INDICATE THAT THE VEHICLE AND THE OBJECT ARE WITHIN A PREDETERMINED DISTANCE OF ONE ANOTHER

FIG. 8

POSITION TRACKING AND PROXIMITY WARNING SYSTEM

CROSS-REFERENCE TO RELATED APPLICATION

This application claims the benefit of co-pending provisional application, No. 60/802,576, filed on May 22, 2006, which is incorporated herein.

TECHNICAL FIELD

This invention relates to position tracking systems in general and more specifically to a position tracking and proximity warning system for mining applications.

BACKGROUND

The 802.11s network communication standard is a wireless, broadband communication standard that addresses and rectifies certain limitations associated with earlier 802.11 standards (a, b, and g). A network system operating in accordance with 802.11s standard is often referred to as a mesh network, as each node in the network is capable of communicating with every other node in the network, either directly, or via one or more intermediate nodes. Earlier 802.11 standards (i.e., a, b, and g) must break connectivity with one node prior to negotiating and establishing a connection with a new node. Consequently, critical data and control commands can be lost while a connection to a new node is established. The 802.11s standard solves this issue by establishing a back-up connection prior to disconnecting. The 802.11s standard essentially maintains two simultaneous connections so that when the signal strength or bandwidth through a specific connection degrades, the communication system automatically switches to the back-up connection, drops the original connection, and establishes a new back-up connection.

A second significant difference between the newer 802.11s standard and the older standards is the manner in which data are transmitted to the back haul layer. Under the older standards (a, b and g), a wireless node communicates directly to all access point that is either directly connected to the back haul layer (e.g., by a fiber optic link), or has line-of-sight to another access point that is connected to the back haul layer. Thus, if the wireless node loses line-of-sight contact with the access point, data cannot be transmitted and have the potential to be lost. While wireless nodes operating in accordance with the 802.11s standard still have line-of-sight limitations, any 802.11s device or node can be used as a repeater to transmit data to the back haul layer. Devices operating in accordance with the 802.11s standard may also transmit on up to three channels simultaneously to maximize the number of possible routes data can take to the back haul.

BRIEF SUMMARY OF THE INVENTION

The following summary is provided as a brief overview of the claimed position tracking system and method for determining a position of a vehicle. The summary shall not limit the invention in any respect, with a detailed and fully enabling disclosure being set forth in the Detailed Description of the Invention. Likewise, the invention shall not be limited in any numerical parameters, specific equipment, operating conditions, environment or other variables unless otherwise stated herein.

Embodiments of a position tracking system for determining a position of a vehicle may comprise at least two position-enabled mesh nodes mounted to the vehicle; a mesh network operatively associated with the at least two position-enabled mesh nodes mounted the vehicle, the mesh network being configured to determine a position of the vehicle based on signals received from the at least two position-enabled mesh nodes mounted to the vehicle; and a display system operatively associated with the mesh network, the display system displaying the position of the vehicle.

Other embodiments may comprise a proximity warning system operatively associated with the mesh network, the proximity warning system issuing a warning signal related to a separation between the vehicle and another object. The proximity warning system may further comprise a display indicator module, the display indicator module providing a visual warning indication related to separation between the vehicle and another object.

In still other embodiments, the position tracking system may further comprise a collision avoidance system operatively associated with the mesh network and the vehicle, the collision avoidance system automatically stopping movement of the vehicle if a collision is imminent between the vehicle and another object.

In yet other embodiments, the position tracking system may further comprise a trajectory calculation system operatively associated with the mesh network, the trajectory calculation system determining a trajectory of the vehicle based on a plurality of position fixes for the vehicle over a time interval.

A method for providing a proximity warning may comprise collecting vehicle position data from a first position-enabled mesh node mounted at a first location of a vehicle and a second position-enabled mesh node mounted at a second location of the vehicle; comparing the vehicle position data to object position data associated with at least one other object; and activating an alarm if the vehicle position data and the object position data indicate that the vehicle and the object are within a predetermined distance of one another.

In other embodiments, a method for avoiding a collision between a vehicle and an object may comprise collecting vehicle position data from a first position-enabled mesh node mounted at a first location of a vehicle and a second position-enabled mesh node mounted at a second location of the vehicle; comparing the vehicle position data to object position data associated with at least one other object; and stopping motion of the vehicle if the vehicle position data and the object position data indicate that the vehicle and the object are within a predetermined distance of one another.

In still other embodiments, a method for avoiding a collision between a vehicle and an object may comprise collecting vehicle position data from a first position-enabled mesh node mounted at a first location of a vehicle and a second position-enabled mesh node mounted at a second location of the vehicle; comparing the vehicle position data to object position data associated with at least one other object; and steering the vehicle away from the object if the vehicle position data and the object position data indicate that the vehicle and the object are within a predetermined distance of one another.

In yet other embodiments, a method for predicting a future course of a vehicle may comprise, at a first time, collecting vehicle position data from a first position-enabled mesh node mounted at a first location of a vehicle and a second position-enabled mesh node mounted at a second location of the vehicle; at a second time after the first time, collecting vehicle position data from the first position-enabled mesh node and the second position-enabled mesh node; calculating a vehicle vector based on the vehicle position data collected at the first time and at the second time; and predicting a path of the vehicle based on the vehicle vector.

BRIEF DESCRIPTION OF THE FIGURES

The accompanying figures, which are incorporated herein and form a part of the specification, illustrate various embodiments of the present invention and together with the description, serve to explain the invention. In the figures:

FIG. 8 shows a method for avoiding a collision between a vehicle and an object.

DETAILED DESCRIPTION OF THE INVENTION

Figure 1:
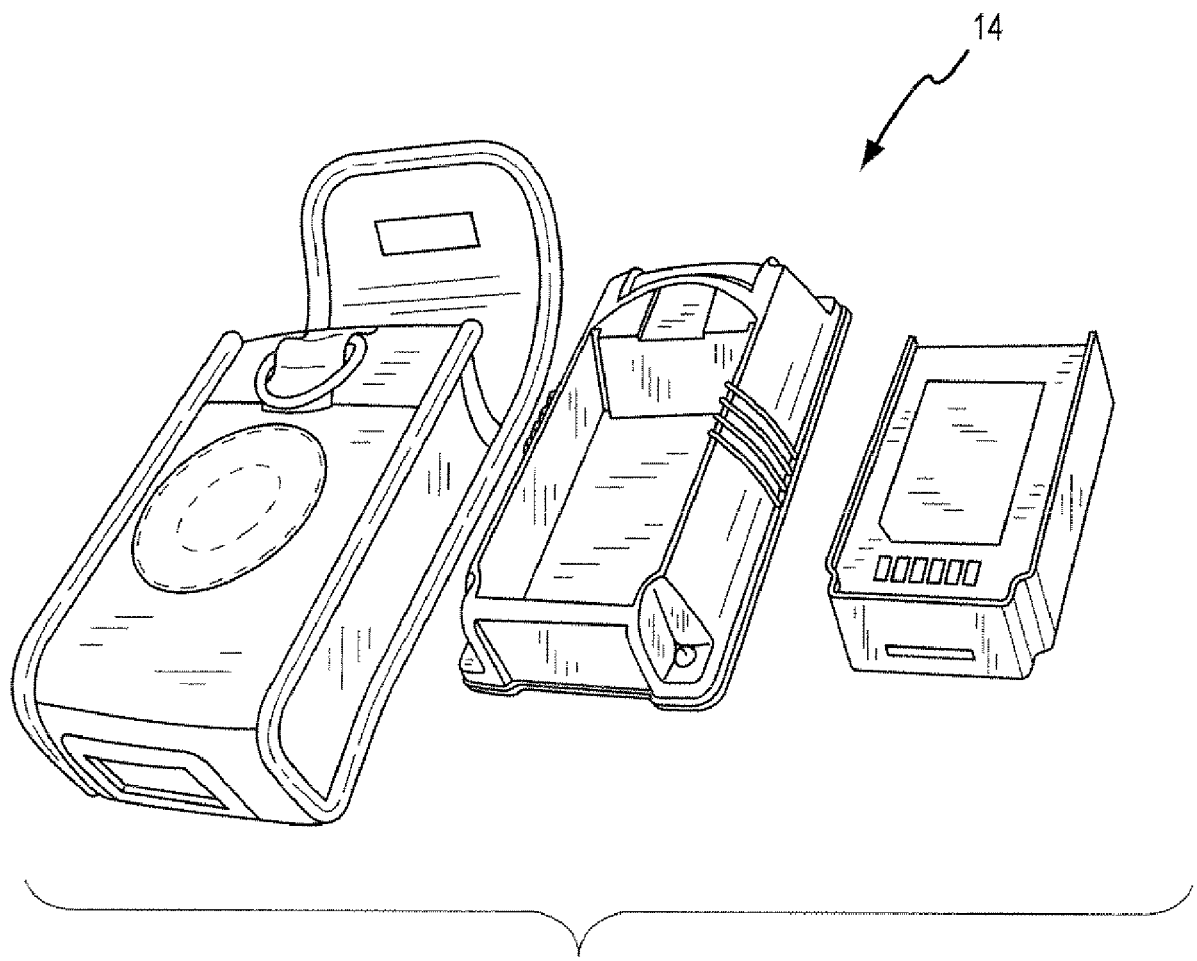
FIG. 1 shows a position-enabled mesh node of the present invention.

A position tracking system 10 for determining a position 11 of a vehicle 12 according to one embodiment may comprise a plurality (i.e., at least two) position-enabled mesh nodes 14 mounted to the vehicle 12. Position-enabled mesh node 14 of the present invention is illustrated in FIG. 1.

Figure 2:
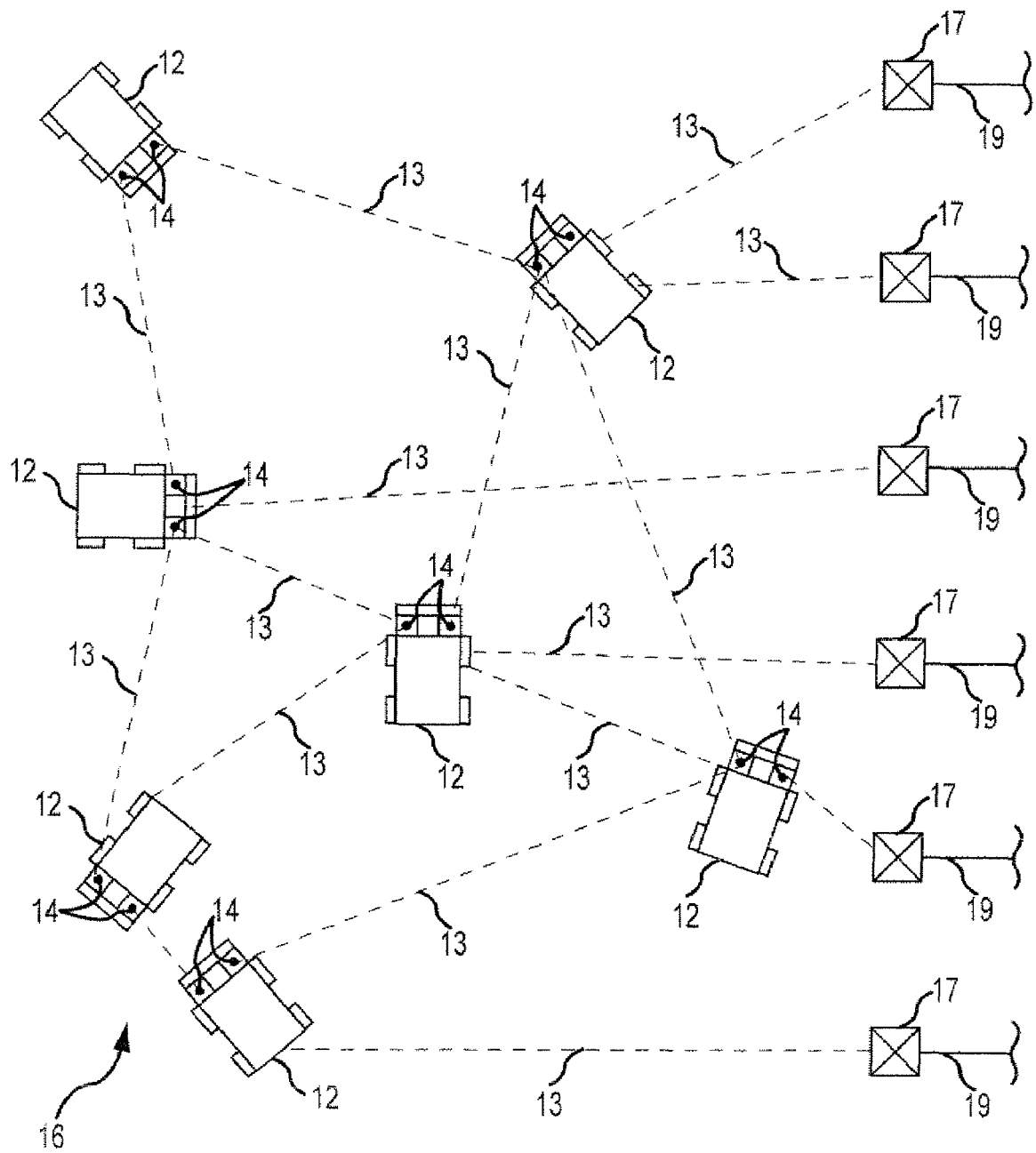
FIG. 2 shows a mesh network operatively associated with position-enabled mesh nodes installed on vehicles.

As shown in FIG. 2, a mesh network 16 is operatively associated with the plurality of position-enabled mesh nodes 14. In addition to the plurality of position-enabled mesh nodes 14, mesh network 16 may comprise signal 13 and access point 17. Signal 13 may comprise any type of wireless or other signal as would be familiar to one of ordinary skill in the art. Mesh network 16 communicates with the position-enabled mesh nodes 14 via signal 13. Signal 13 may comprise peer-to-peer communications between vehicles 12, between vehicle 12 and access point 17 or any combination thereof. Access point 17 may be connected to a local area network, or LAN, via connection line 19. Mesh network 16 is also configured to determine the position 11 of the vehicle 12 based on signal(s) 13 received from the plurality of position-enabled mesh nodes 14 mounted to the vehicle 12. A display system 18 operatively associated with the mesh network 16 displays the position 11 of the vehicle 12.

In one embodiment, each of the position-enabled mesh nodes 14 may comprise a wireless position-enabled mesh node of the type available from Motorola, Inc., as a component of its MeshNetworks Positioning System. When properly configured, the position tracking system 10 may be used to identify the positional locations of the position-enabled mesh nodes 14. Such position-enabled mesh nodes 14 may be utilized to advantage in an environment 15, (e.g., mining, construction or industrial environment) to identify the position(s) 11 of various vehicles 12, such as haulage truck 112, shovels, or other equipment operating within the environment 15. Optionally, the position tracking system 10 may also be provided with a proximity warning system 20 and a collision avoidance system 22 in the manner described herein.

Briefly, the proximity warning system 20 may provide a warning to a vehicle operator (e.g., a truck driver) if the vehicle 12 and another object converge to within a predetermined distance 30 of one another in the environment 15. The object may comprise immoveable object 24 (e.g., building, structure) or moveable object 25 (e.g., vehicle 12, person). The vehicle operator may then take appropriate action to avoid a collision. The collision avoidance system 22 may comprise an additional component of the position tracking system 10 and may be used with or without the proximity warning system 20. As will be described in greater detail below, the collision avoidance system 22 may be used to automatically shut-down the vehicle 12 if a collision in the environment 15 is imminent. Alternatively, the collision avoidance system 22 may be configured to steer the vehicle 12 appropriately in order to avoid a collision in the environment 15.

Continuing now with the description, the at least two position-enabled mesh nodes 14 should be mounted to two different positions on the vehicle 12. The provision of a plurality of position-enabled mesh nodes 14 to the vehicle 12 will reduce position 11 data "drop outs" due to blind spots (e.g., loss of line-of-sight communication between two nodes). In addition, providing a plurality of position-enabled mesh nodes 14 to the vehicle 12 will allow the proximity warning system 20 and/or collision avoidance system 22 to determine the location of various "extremities" of the vehicle 12. The ability to determine the locations of vehicle extremities may be particularly important in large vehicle 12, such as haulage truck 112, as well as vehicles 12 containing moveable elements, such as dump bed 130, shovel buckets, blades, etc., that are not fixed with respect to a main chassis or frame of the vehicle 12.

In one embodiment position-enabled mesh nodes 14 are mounted to the vehicle 12 so that their respective antennae 16 correspond with the left front 26 and right front 28 corners of the vehicle 12. Consequently, the positions of these position-enabled mesh nodes 14 will correspond to the positions of the respective left and right corners 26, 28 of the vehicle. Similarly, position-enabled mesh nodes 14 may also be mounted to the vehicle 12 so that their respective antennae 16 correspond with the left and right rear corners of the vehicle 12. Thus, the positions of the left and right rear corners of the vehicle 12 may be determined by correlating the positions of the antennae 16 of the position-enabled mesh nodes 14. It may also be desirable to mount positioned-enabled mesh node 14 to the rear axle of the vehicle. So mounting position-enabled mesh node 14 on the rear axle of the vehicle 12 may enhance the ability of the mesh network 16 to receive accurate position 11 information from locations behind the vehicle 12 that might otherwise be blocked by portions of the vehicle 12 positioned between the antenna 16 and a receiving node of the mesh network 16.

Figure 3:
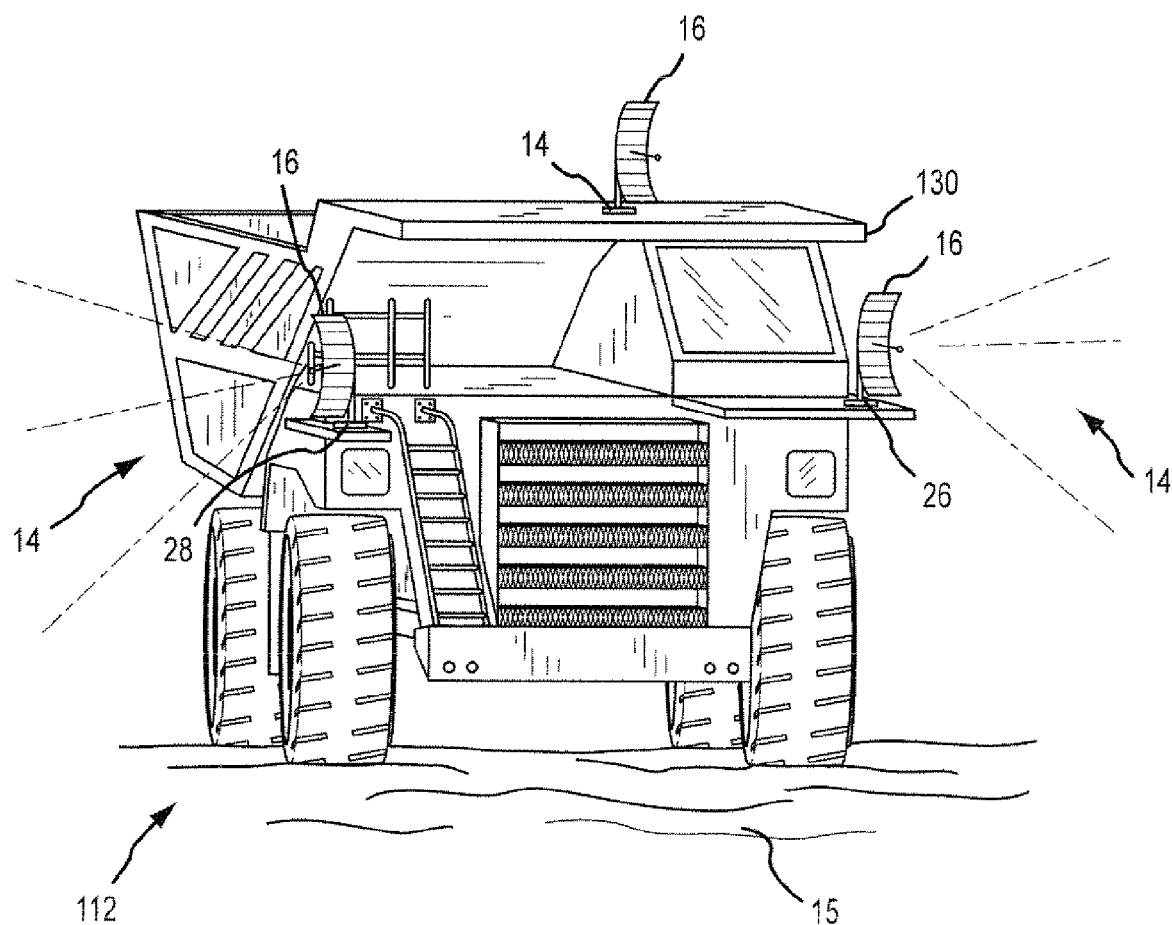
FIG. 3 shows an embodiment of the present invention wherein position-enabled mesh nodes are mounted on a haulage truck.

Depending on the type of vehicle and its configuration, it may be desirable to mount additional positioned-enabled mesh nodes 14 to the vehicle 12 so that all extremity portions of the vehicle 12 may be monitored by the mesh network 16. For example, as shown in FIG. 3, one or more position-enabled mesh nodes 14 may be mounted to the moveable dump bed 130 of haulage truck 112 to ensure that the location of the raised dump bed 130 can be determined, thereby avoiding contact with overhead items or objects. Similarly, one or more positioned-enabled mesh nodes 14 maybe mounted to a shovel bucket and/or various locations of the bucket arm to ensure that position information of such vehicle extremities can be determined. Consequently, because the positions of all vehicle extremities can be determined, the proximity warning system 20 and/or collision avoidance system 22 will be more effective in providing a warning and/or taking affirmative action (e.g., machine stoppage or shut-down) in order to avoid contact and/or prevent collisions in the environment 15.

The proximity warning system 20 may comprise a portion of the position tracking system 10 and is operatively associated with the mesh network 16. The proximity warning system 20 collects from the mesh network 16 position 11 data (i.e., "fixes") relating to the vehicle 12 (and its extremities) and compares them to the position 11 associated with immoveable object 24 and moveable object 25. If the vehicle 12 converges to within a predetermined distance 30 of immoveable object 24 or moveable object 25, the proximity warning system 20 may activate an alarm. In this regard it should be noted that the position 11 associated with objects may be fixed or constant (such as that associated with immoveable objects 24, such as buildings and fixed pieces of equipment) and need not necessarily come from the mesh network 16. Alternatively, the position 11 could be data associated with moveable object 25 obtained from the mesh network 16. In order for moveable object 25 to register position 11, moveable object 25 should be equipped with position-enabled mesh node 14, such as that shown in FIG. 1. The proximity warning system 20 may be implemented as computer software operating on a computer associated with the mesh network 16.

Figure 4:
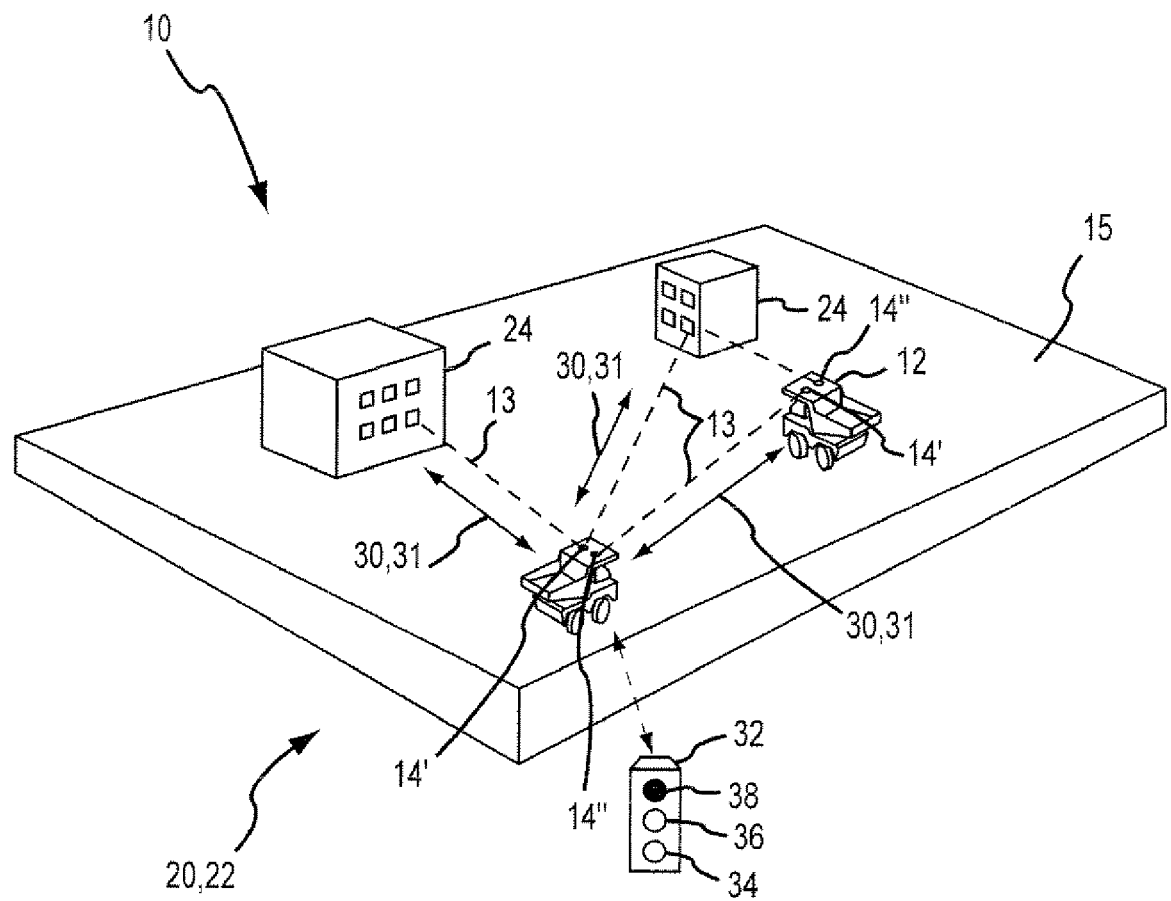
FIG. 4 shows a proximity warning system of the present invention.
Figure 5:
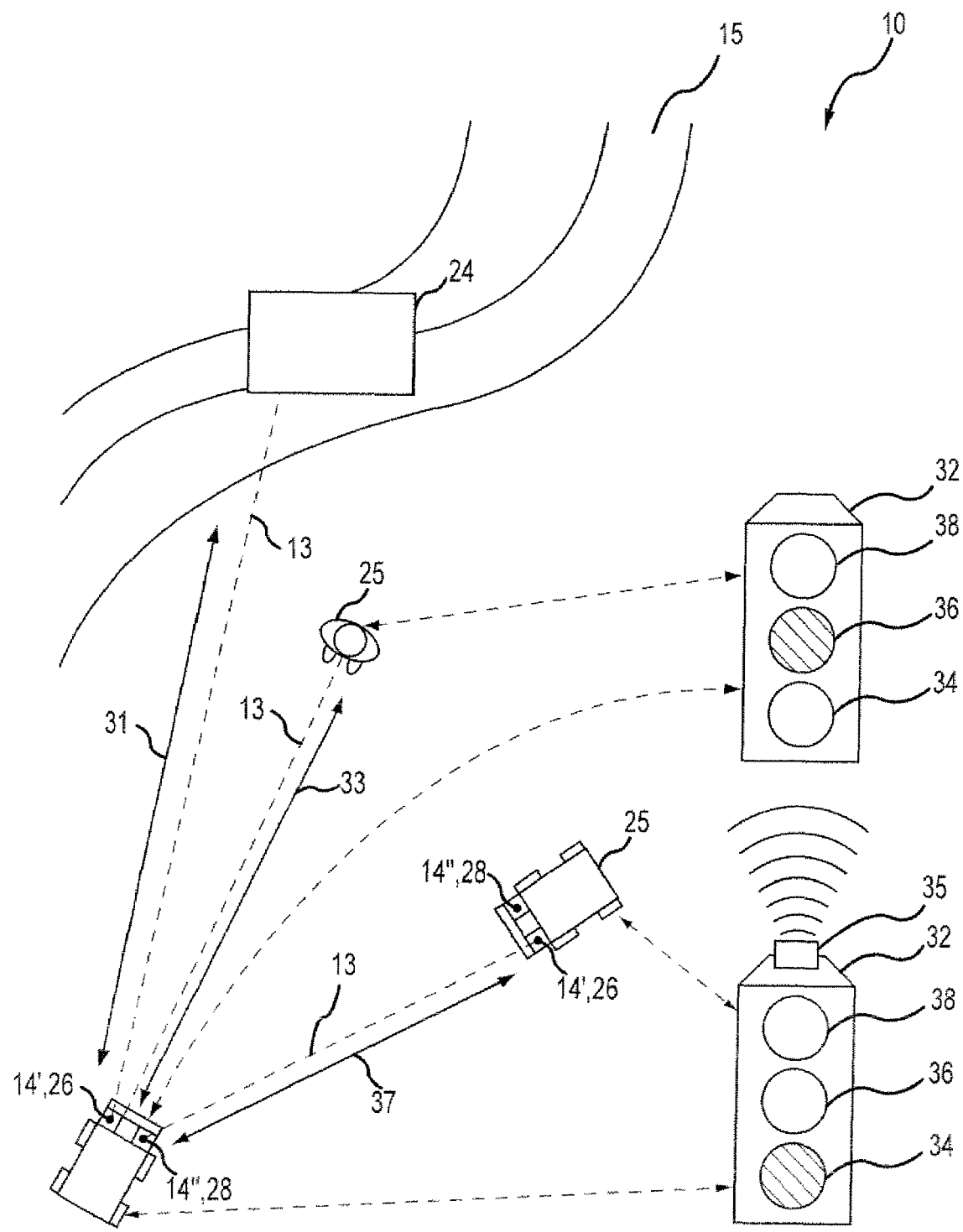
FIG. 5 shows another view of the proximity warning system of the present invention.

The proximity warning system 20 may also comprise a display indicator module 32 for providing a visual or aural warning to the vehicle operator. In one embodiment, the display indicator module 32 comprises red 34, yellow 36, and green 38 annunciator lamps to provide a visual indication about whether any portion of the vehicle 12 is within a predetermined distance 30 of immoveable object 24 or moveable object 25. The display indicator module 32 may also be provided with an audible alarm 35. Predetermined distance 30 may comprise a permitted distance 31, a caution distance 33 and an alarm distance 37. By way of example, as shown in FIG. 4, the proximity warning system 20 may be programmed to illuminate the green annunciator lamp 38 so long as the potentially interfering immoveable object 24 and/or moveable object 25 remain more than permitted distance 31 (e.g., beyond 32 feet) away from vehicle 12. As shown in FIG. 5, if the distance decreases to less than the permitted distance 31, the vehicle 12 may be considered to be within the caution distance 33 of immoveable object 24 or moveable object 25. In that case, the proximity warning system 20 will illuminate the yellow annunciator lamp 36. If the distance between vehicle 12 and immoveable object 24 or moveable object 25 farther closes to within the alarm distance 37 (e.g., 16 feet or less), the proximity warning system 20 will illuminate the red annunciator lamp 34 and sound the audible alarm 35.

The position tracking system 10 may also be provided with a collision avoidance system 22. The collision avoidance system 22 may also be implemented as a computer software program running on a computer operatively associated with the mesh network 16. The collision avoidance system 22 collects data (i.e., "fixes") for the position 11 of vehicle 12 obtained from the mesh network 16 and compares them to the position 11 associated with immoveable object 24 and/or moveable object 25. If it is determined that vehicle 12 is on a collision course with either immoveable object 24 or moveable object 25, the collision avoidance system 22 will take appropriate action. As was the case for the proximity warning system 20, the position 11 associated with immoveable object 24 may be fixed or constant and need not necessarily be obtained from the mesh network 16. Alternatively, the position 11 could be data associated with moveable object 25 obtained from the mesh network 16. In order for moveable object 25 to register position 11, moveable object 25 should be equipped with position-enabled mesh node 14, such as that shown in FIG. 1.

The collision avoidance system 22 may comprise an automatic vehicle shut-down system to automatically (i.e., without operator intervention) shut-down or stop the vehicle 12 if the distance between the vehicle 12 and immoveable object 24 or moveable object 25 closes to within the alarm distance 37 (e.g., 16 feet). Alternatively, the collision avoidance system 22 may also be configured to steer the vehicle 12 out of the way of immoveable object 24 or moveable object 25.

Other embodiments of the invention may be provided with a predictive path or trajectory calculation system to map out or determine a predicted future course of the vehicle 12. Briefly, the system utilizes a plurality of positions 11, or "fixes," over time to ascertain a vehicle vector. The direction and magnitude of the vehicle vector may then be used to predict the path of the vehicle 12 and its future position. Subsequent position 11 data received from the position-enabled mesh nodes 14 on the vehicle 12 may be used to update the vehicle vector, predicted path and position 11. If a potential conflict is discovered, an appropriate warning may be issued such as, for example, via the proximity warning system 20 or collision avoidance system 22.

Figure 6:
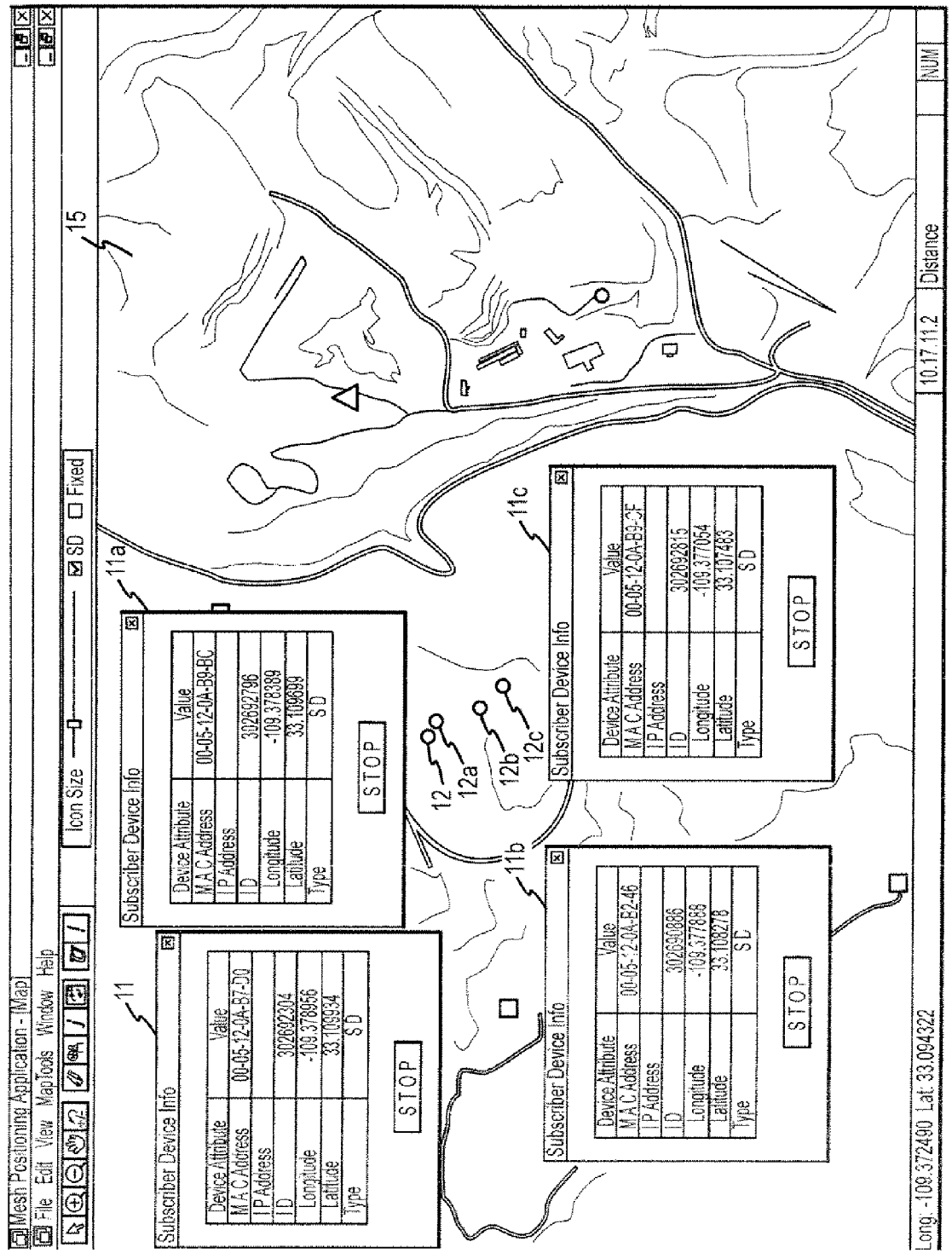
FIG. 6 shows a display system of the present invention.

In addition to the display indicator module 32 that may be provided in vehicle 12 or in any other suitable location, various embodiments of the invention may comprise display system 18 operatively associated with the mesh network 16 to provide a graphic display of vehicle 12 and its respective position 11. The display system 18 of the position 11 of vehicle 12 may be presented in graphic form showing an aerial view (e.g., a satellite image) of the environment 15. For example, in FIG. 6, the display system 18 displays an aerial view of environment 15, showing vehicles 12, 12a, 12b and 12c with their respective positions 11, 11a, 11b and 11c. The display system 18 may allow a system operator to readily obtain a "birds eye" view of the position(s) 11 of the vehicle (s) 12 and predicted paths, if so desired. Display system 18 may also be provided within vehicle 12 or in a central location or other suitable location as would be familiar to one of ordinary skill in the art after becoming familiar with the teachings disclosed herein.

Figure 7:
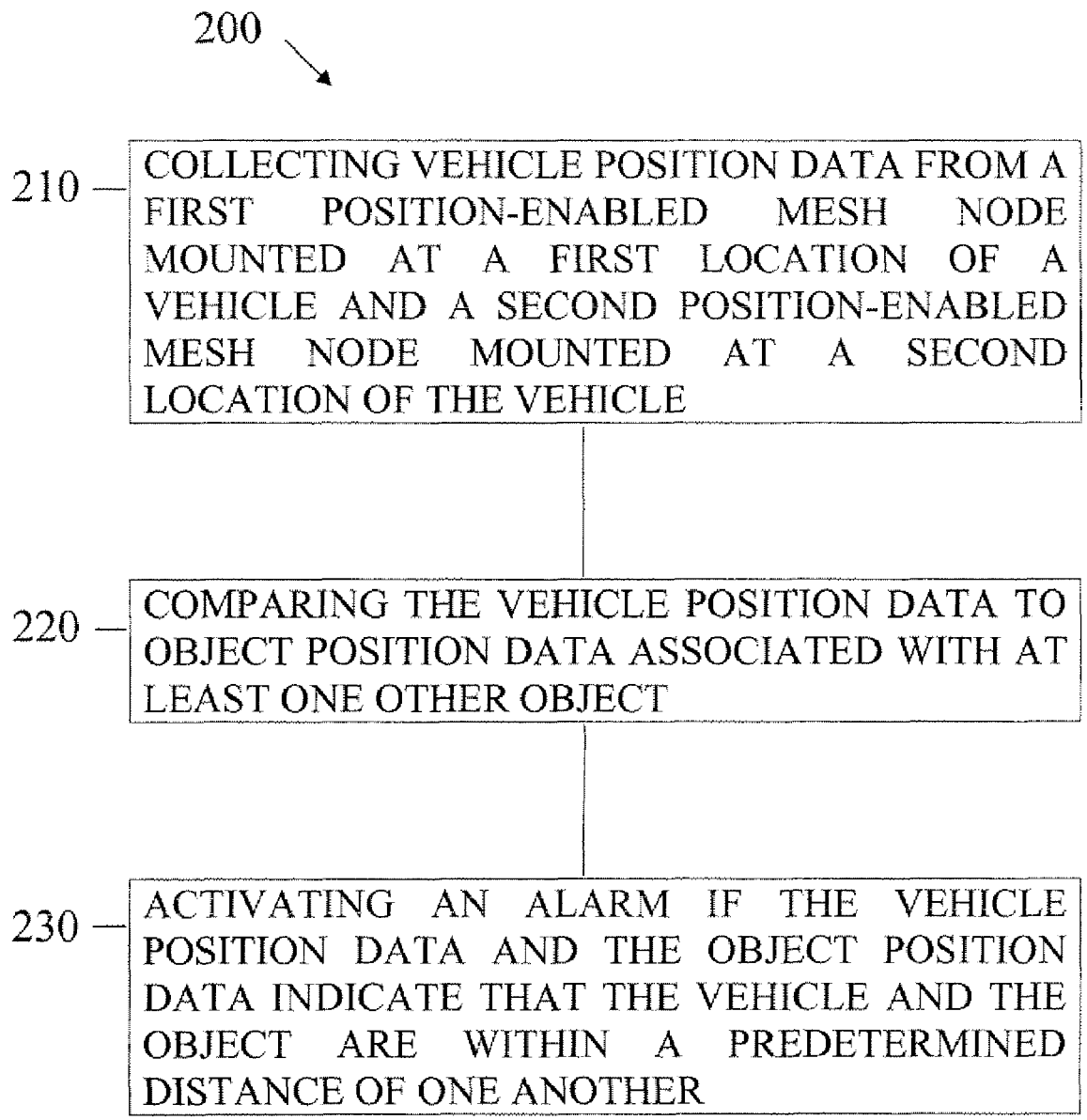
FIG. 7 shows a method for providing a proximity warning.

According to one embodiment of the invention shown in FIG. 7, a method 200 for providing a proximity warning, may comprise collecting 210 vehicle position data from a first position-enabled mesh node 14' mounted at a first location of the vehicle 12 (e.g., the left front 26 corner) and a second position-enabled mesh node 14" mounted at a second location of the vehicle 12 (e.g., the right front 28 corner). After the position 11 data has been collected, the method 200 may comprise comparing 220 the vehicle position 11 data to object position 11 data associated with at least one other object, which may be moveable object 25 or immoveable object 24, for example. Then, the method 200 may comprise activating 230 an alarm if the vehicle position 11 data and the object position 11 data indicate that the vehicle 12 and the object 24, 25 are within predetermined distance 30 of one another.

As explained above, the alarm may be a visual or aural alarm. Thus, another embodiment of the method may comprise activating a green-colored annunciator 38 so long as a distance separating the object 24, 25 and the vehicle 12 exceeds a first distance, which may be permitted distance 31; activating a yellow-colored annunciator 36 when the distance separating the object 24, 25 and the vehicle 12 is less than the first distance but greater than a second distance, which may be within caution distance 33; and activating a red-colored annunciator 34 when the distance separating the object 24, 95 and the vehicle 12 is less than the second distance, which may be alarm distance 37.

In another embodiment, the vehicle position 11 data may comprise raw data. The method may further comprise correlating the raw position data with information relating to the respective positions on the vehicle 12 of the first and second locations to produce the vehicle position 11 data.

FIG. 8 illustrates method 300 for avoiding a collision between vehicle 12 and the object, which may be either moveable object 25 or immoveable object 24. Method 300 may comprise collecting 310 vehicle position 11 data from first position-enabled mesh node 14' mounted at the first location of vehicle 12 and second position-enabled mesh node 14'' mounted at the second location of the vehicle 12. Method 300 may further comprise comparing 320 the vehicle position 11 data to object position 11 data associated with at least one other object 24, 25. Method 300 may comprise stopping 330 motion of the vehicle 12 if the vehicle position 11 data and the object position 11 data indicate that the vehicle 12 and the object 24, 25 are within predetermined distance 30 of one another.

Figure 9:
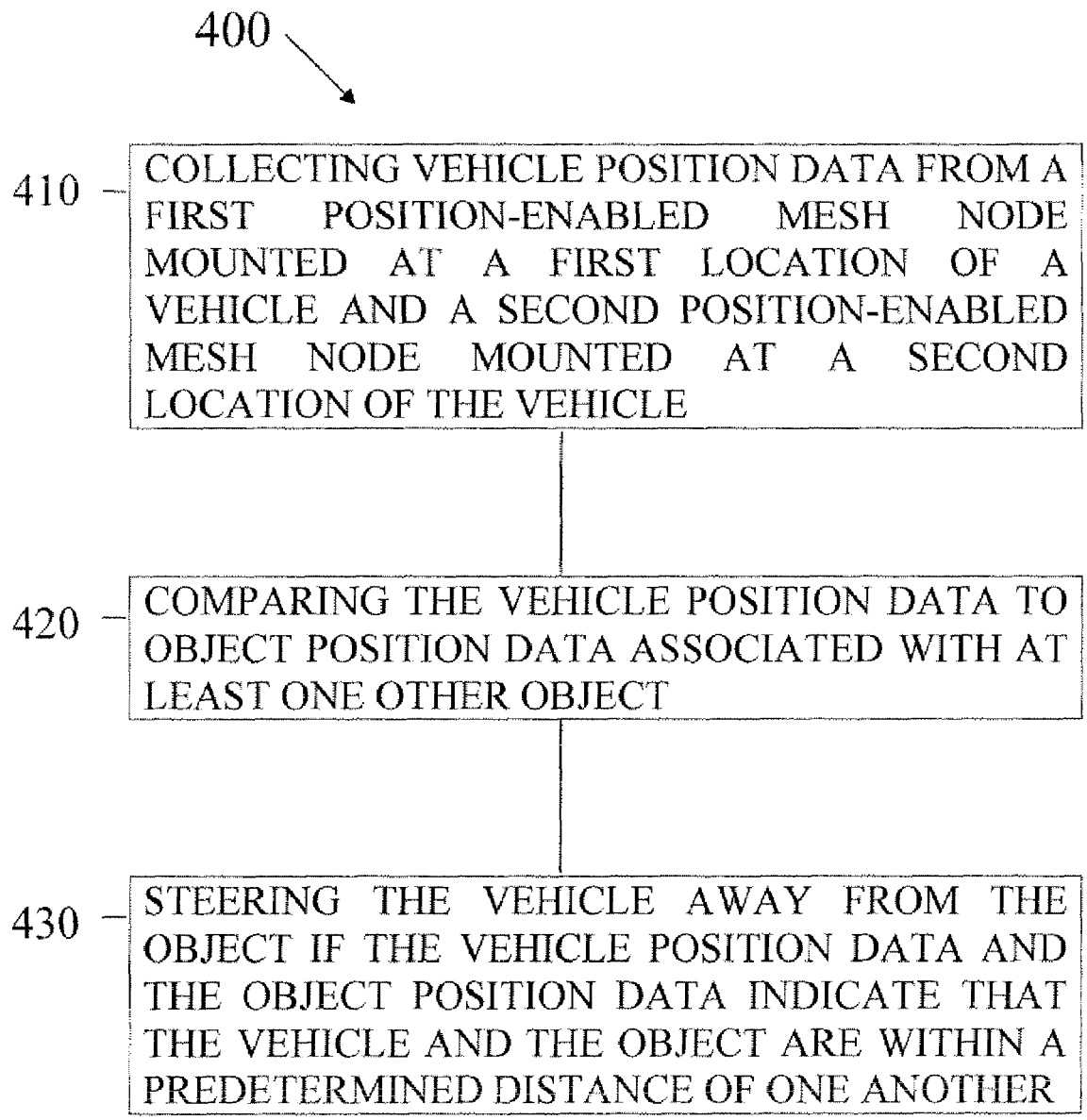
FIG. 9 shows another embodiment of a method for avoiding a collision between a vehicle and an object.

In still another embodiment of the invention, FIG. 9 illustrates method 400 for avoiding a collision between vehicle 12 and object 24, 25. Method 400 may comprise collecting 410 vehicle position 11 data from first position-enabled mesh node 14' mounted at the first location of vehicle 12 and the second position-enabled mesh node 14'' mounted at the second location of the vehicle 12. Method 400 may further comprise comparing 420 the vehicle position 11 data to object position 11 data associated with at least one other object 24, 25, and steering 430 the vehicle 12 away from the object 24, 25 if the vehicle position 11 data and the object position 11 data indicate that the vehicle 12 and the object 24, 25 are within predetermined distance 30 of one another.

Figure 10:
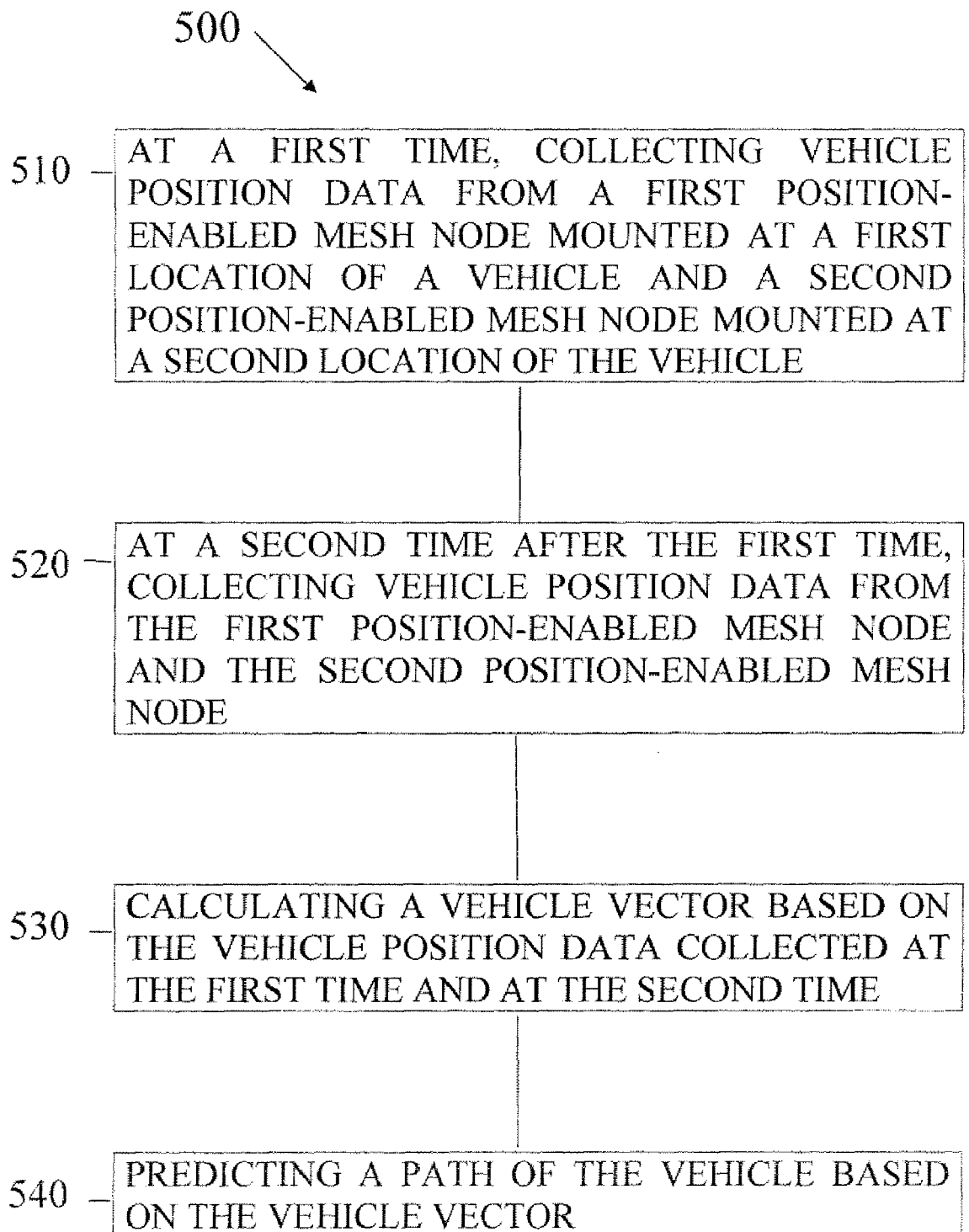
FIG. 10 shows a method for predicting a future course of a vehicle.

An additional embodiment of the present invention is illustrated in FIG. 10. Method 500 for predicting a future course of vehicle 12 may comprise, at a first time, collecting 510 vehicle position 11 data from first position-enabled mesh node 14' mounted at the first location of vehicle 12 and second position-enabled mesh node 14'' mounted at the second location of the vehicle 12. At a second time (which is after the first time), method 500 may further comprise collecting 520 vehicle position 11 data from the first position-enabled mesh node 14' and the second position-enabled mesh node 14''. Method 500 may also comprise calculating 530 a vehicle vector based on the vehicle position 11 data collected at the first time and at the second time. Method 500 may further comprise predicting 540 a path of the vehicle 12 based on the vehicle vector.

Any of the methods of the present invention may be implemented by computer it readable storage media tangibly embodying program instructions for performing the methods.

Having herein set forth various embodiments of the present invention it is anticipated that modifications will naturally occur to those of skill in the art after becoming familiar with the present invention. It is anticipated that such suitable modifications will nonetheless remain within the scope of the invention. The invention shall therefore be construed in accordance with the following claims.

The invention claimed is:

1. A position tracking system for determining a position of a vehicle within an environment, comprising:
a plurality of position-enabled mesh nodes positioned within the environment;
at least two vehicle-mounted, position-enabled mesh nodes mounted to respective first and second locations on the vehicle, at least one of the first and second locations corresponding to an extremity of the vehicle, said at least two vehicle-mounted, position-enabled mesh nodes exchanging radio signals with said plurality of position-enabled mesh nodes positioned within the environment to form a mesh network, said at least two vehicle-mounted, position-enabled mesh nodes and said plurality of position-enabled mesh nodes positioned within the environment also exchanging radio signals to determine their relative positions with respect to one another based only on the radio signals exchanged between the position-enabled mesh nodes forming the mesh network, said position tracking system determining the relative position of the vehicle, including the extremity of the vehicle, with respect to said plurality of position-enabled mesh nodes positioned within the environment; and
a display system operatively associated with said mesh network, said display system displaying the position of the vehicle relative to said plurality of position-enabled mesh nodes positioned within the environment.

2. The position tracking system of claim 1, further comprising:
a first antenna connected to a first one of said at least two vehicle-mounted, position-enabled mesh nodes, said first antenna being mounted to the first location on the vehicle; and
a second antenna connected to a second one of said at least two vehicle-mounted, position-enabled mesh nodes, said second antenna being mounted to the second location on the vehicle.

3. The position tracking system of claim 2, wherein at least one of the plurality of position-enabled mesh nodes in the environment is associated with an object in the environment, said position tracking system further comprising a proximity warning system, said proximity warning system issuing warning signals based on a relative separation between the object and either: a) the vehicle or b) the extremity of the vehicle.

4. The position tracking system of claim 3, wherein said proximity warning system further comprises a display indicator module mounted within the vehicle, the display indicator module providing a visual warning indication related to the relative separation between the object and either: a) the vehicle or b) the extremity of the vehicle.

5. The position tracking system of claim 1, further comprising a collision avoidance system operatively associated with the mesh network and the vehicle, the collision avoidance system automatically stopping movement of the vehicle if a collision is imminent between the object and either: a) the vehicle or b) the extremity of the vehicle.

6. The position tracking system of claim 1, further comprising a trajectory calculation system operatively associated with the mesh network, the trajectory calculation system determining a trajectory of the vehicle based on a plurality of position fixes for the vehicle over a time interval.

7. The position tracking system of claim 1, wherein said at least two vehicle-mounted, position-enabled mesh nodes comprise first and second position-enabled mesh nodes mounted to respective first and second locations on a main body portion of the vehicle, and a third position-enabled mesh node mounted to a moveable element of the vehicle, said first, second, and third position-enabled mesh nodes exchanging radio signals with said plurality of position-enabled mesh nodes positioned within the environment to form the mesh network, said first, second, and third position-enabled mesh nodes and said plurality of position-enabled mesh nodes positioned within the environment also exchanging radio signals to determine their relative positions with respect to one another based only on the radio signals exchanged between the position-enabled mesh nodes forming the mesh network, said position tracking system determining the relative position of the main body portion of the vehicle, including the moveable element of the vehicle, with respect to said plurality of position-enabled mesh nodes positioned within the environment.

8. The position tracking system of claim 7, further comprising:
a first antenna connected to a first one of said at least two vehicle-mounted, position-enabled mesh nodes, said first antenna being mounted to the first location on the main body of the vehicle;
a second antenna connected to a second one of said at least two vehicle-mounted, position-enabled mesh nodes, said second antenna being mounted to the second location on the main body of the vehicle; and
a third antenna connected to a third one of said at least two vehicle-mounted, position-enabled mesh nodes, said third antenna being mounted to the moveable element of the vehicle.

9. A method, comprising:
operating a plurality of position-enabled mesh nodes provided within an environment to form a mesh network, the plurality of position-enabled mesh nodes including:
a plurality of position-enabled mesh nodes positioned within the environment; and
at least two vehicle-mounted, position-enabled mesh nodes mounted to respective first and second locations on a vehicle operating within the environment, at least one of the first and second locations corresponding to an extremity of the vehicle;
exchanging radio signals between the plurality of position-enabled mesh nodes in the environment and the at least two position-enabled mesh nodes on the vehicle to determine their relative positions with respect to one another based only on the radio signals exchanged between the position-enabled mesh nodes forming the mesh network; and
determining the relative position of the vehicle, including the extremity of the vehicle, with respect to said plurality of position-enabled mesh nodes in the environment.

10. The method of claim 9, wherein at least one of the plurality of position-enabled mesh nodes in the environment is associated with an object in the environment, said method further comprising activating an alarm when the object is within a predetermined distance of either: a) the vehicle or b) the extremity of the vehicle.

11. The method of claim 10, wherein activating an alarm comprises activating a visual alarm.

12. The method of claim 11, wherein activating a visual alarm comprises:
activating a green-colored annunciator so long as a distance separating the object and either: a) the vehicle or b) the extremity of the vehicle, exceeds a first distance;
activating a yellow-colored annunciator when the distance separating the object and either: a) the vehicle or b) the extremity of the vehicle, is less than the first distance and greater than a second distance; and
activating a red-colored annunciator when the distance separating the object and either: a) the vehicle or b) the extremity of the vehicle, is less than the second distance.

13. The method of claim 10, wherein activating an alarm comprises activating an aural alarm.

14. The method of claim 10, further comprising stopping motion of the vehicle when the object and either: a) the vehicle or b) the extremity of the vehicle, are within a predetermined distance of one another.

15. The method of claim 10, further comprising steering the vehicle away from the object when the object and either: a) the vehicle or b) the extremity of the vehicle, are within a predetermined distance of one another.

16. The method of claim 9, further comprising displaying, on a display system, the position of the vehicle relative to said plurality of position-enabled mesh nodes positioned within the environment.

17. The method of claim 9, further comprising:
at a first time, exchanging radio signals between the plurality of position-enabled mesh nodes in the environment and the at least two vehicle-mounted, position-enabled mesh nodes on the vehicle to determine a first relative position of the vehicle with respect to at least one of the plurality of position-enabled mesh nodes in the environment;
at a second time after the first time, exchanging radio signals between the plurality of position-enabled mesh nodes in the environment and the at least two vehicle-mounted, position-enabled mesh nodes on the vehicle to determine a second relative position of the vehicle with respect to at least one of the plurality of position-enabled mesh nodes in the environment
calculating a vehicle vector based on the first and second relative positions; and
predicting a path of the vehicle based on the vehicle vector.

* * * * *

UNITED STATES PATENT AND TRADEMARK OFFICE
CERTIFICATE OF CORRECTION

PATENT NO.       : 7,656,311 B2                              Page 1 of 1
APPLICATION NO.  : 11/751298
DATED            : February 2, 2010
INVENTOR(S)      : Steven C. Holmes et al.

It is certified that error appears in the above-identified patent and that said Letters Patent is hereby corrected as shown below:

Column 1, line 42: delete "all" and insert --an--
Column 6, line 49: delete "farther" and insert --further--
Column 7, line 52: delete "it"

Signed and Sealed this

Fourteenth Day of December, 2010

David J. Kappos
*Director of the United States Patent and Trademark Office*